(12) United States Patent
Okita

(10) Patent No.: US 10,087,828 B2
(45) Date of Patent: Oct. 2, 2018

(54) SADDLE RIDDEN VEHICLE

(71) Applicant: SUZUKI MOTOR CORPORATION, Hamamatsu-shi, Shizuoka (JP)

(72) Inventor: Kazuhiro Okita, Hamamatsu (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 112 days.

(21) Appl. No.: 15/268,110

(22) Filed: Sep. 16, 2016

(65) Prior Publication Data
US 2017/0114715 A1 Apr. 27, 2017

(30) Foreign Application Priority Data

Oct. 27, 2015 (JP) .................. 2015-210463

(51) Int. Cl.
| | |
|---|---|
| *F02B 39/12* | (2006.01) |
| *B60K 13/04* | (2006.01) |
| *F02B 33/40* | (2006.01) |
| *F02B 37/00* | (2006.01) |
| *F02D 41/00* | (2006.01) |
| *F02M 35/16* | (2006.01) |
| *F02D 11/10* | (2006.01) |
| *B62K 11/04* | (2006.01) |

(52) U.S. Cl.
CPC .............. *F02B 39/12* (2013.01); *B60K 13/04* (2013.01); *F02B 33/40* (2013.01); *F02B 37/00* (2013.01); *F02D 11/10* (2013.01); *F02D 41/0007* (2013.01); *F02M 35/162* (2013.01); *B62K 11/04* (2013.01)

(58) Field of Classification Search
CPC ......... B60K 11/04; B60K 13/04; F02B 33/40; F02B 37/00; F02B 39/12; F02D 11/10; F02D 41/0007

USPC .......................................... 180/219
See application file for complete search history.

(56) References Cited

U.S. PATENT DOCUMENTS

| | | | |
|---|---|---|---|
| 2004/0031635 A1* | 2/2004 | Pichler ................. | B60K 5/04 180/190 |
| 2015/0083513 A1 | 3/2015 | Ito et al. ............... | 180/229 |
| 2015/0107923 A1* | 4/2015 | Inayama ............... | B60K 11/04 180/229 |

FOREIGN PATENT DOCUMENTS

| | | | |
|---|---|---|---|
| DE | 10 2014 113 929 A1 | 3/2015 | |
| DE | 102014113929 A1 * | 3/2015 | ............. B60K 13/02 |
| JP | 2002-256895 A | 9/2002 | |

OTHER PUBLICATIONS

German Office Action dated Jan. 26, 2018, issued to German Application No. 10 2016 012 769.4.

* cited by examiner

*Primary Examiner* — Tony H Winner
*Assistant Examiner* — Felicia L. Brittman
(74) *Attorney, Agent, or Firm* — Stein IP, LLC

(57) ABSTRACT

A saddle-ridden vehicle includes: an engine; a clutch which enables or disables motive power transmission between a crankshaft provided in the engine and a transmission mechanism; a turbocharger which compresses air for burning to be supplied to the engine; and a throttle device which adjusts a rate of air supply to the engine by controlling an opening angle of a throttle valve using a drive motor, the turbocharger includes a turbine unit which is driven by exhaust gas of the engine and a compressor unit which compresses air receiving drive force of the turbine unit; the clutch is disposed at one side, in a vehicle width direction, of the engine; and the compressor unit and the drive motor are disposed at the other side of the engine in the vehicle width direction.

6 Claims, 12 Drawing Sheets

SADDLE RIDDEN VEHICLE

CROSS-REFERENCE TO RELATED APPLICATIONS

This application claims the benefit of Japanese Patent Application JP 2015-210463, filed Oct. 27, 2015, the entire content of which is hereby incorporated by reference, the same as if set forth at length.

FIELD OF THE INVENTION

The present invention relates to a saddle-ridden vehicle having a turbocharged engine.

BACKGROUND OF THE INVENTION

Among saddle-ridden vehicles such as motorcycles are ones that are equipped with an electronic throttle control device which controls the opening angle of a throttle valve by driving a drive motor on the basis of a manipulation amount of a throttle grip or the like.

For example, JP-A-2002-256895 discloses an electronic throttle control device which is equipped with a fuel injection valve and a throttle valve disposed in an air intake passage of an engine and a drive motor for varying the opening angle of the throttle valve. The drive motor is disposed on the same side as the fuel injection valve. This electronic throttle control device prevents size increase of the engine by a measure that the drive motor is disposed in a free space around the fuel injection valve.

SUMMARY OF THE INVENTION

Incidentally, saddle-ridden vehicles are known that are equipped with a turbocharged engine to increase the fuel efficiency and output power. However, turbocharged engines require a high-power drive motor because a throttle valve position control is performed against air that has been compressed by the turbocharger. Thus, the drive motor is made heavier than in natural aspiration engines. Furthermore, producing a higher power than natural aspiration engines do, turbocharged engines require increase in clutch capacity (i.e., pressure resistance). This results in weight increase of the clutch because of increase in the number of clutch plates or their diameter.

As described above, in saddle-ridden vehicles having a turbocharged engine, it is necessary to arrange relatively heavy components such as the drive motor and the clutch in a well-balanced manner. Thus, the electronic throttle control device of JP-A-2002-256895 cannot be applied simply to their turbocharged engine.

The present invention has been made to solve the above problem, and an object of the invention is therefore to provide a saddle-ridden vehicle having a turbocharged engine with a well-balanced weight distribution.

A saddle-ridden vehicle of the present invention comprises: an engine; a clutch which enables or disables motive power transmission between a crank shaft provided in the engine and a transmission mechanism; a turbocharger which compresses air for burning to be supplied to the engine; and a throttle device which adjusts the rate of air supply to the engine by controlling the opening angle of a throttle valve using a drive motor, wherein: the turbocharger comprises a turbine unit which is driven by exhaust gas of the engine and a compressor unit which compresses air receiving drive force of the turbine unit; the clutch is disposed at one side, in the vehicle width direction, of the engine; and the compressor unit and the drive motor are disposed at other side of the engine in the vehicle width direction.

In this configuration, the compressor unit of the turbocharger and the drive motor of the throttle device are located on the side opposite to the clutch in the vehicle width direction. That is, the clutch, the compressor unit, and the drive motor are disposed so that the engine unit is rendered approximately in a balanced state in terms of mechanics. As a result, the engine unit can be balanced approximately equally in weight distribution in the vehicle width direction.

It is preferable that the turbocharger is disposed in front of the engine; and the drive motor is disposed in the rear of the engine.

In this configuration, the drive motor is located at such a position as to be distant from the turbocharger with the engine interposed between them. This suppresses a phenomenon that heat of the turbocharger adversely affects the drive motor.

It is preferable that the engine comprises a cylinder which is erected from a top portion of a crank case which houses the crank shaft; the turbocharger is disposed in front of the cylinder; and the clutch and the drive motor are disposed in the rear of the cylinder.

According to this configuration, the turbocharger (compressor unit), the drive motor, and the clutch can be arranged in a well-balanced manner in a range that is centered by the cylinder.

It is preferable that the saddle-ridden vehicle further comprises an exhaust pipe which is connected to the turbine unit and discharges exhaust gas of the engine to the outside; the turbine unit is disposed adjacent to a central portion, in the vehicle width direction, of the engine; the compressor unit is disposed at other side of the turbine unit in the vehicle width direction; and the exhaust pipe is disposed at one side of the turbine unit in the vehicle width direction.

In this configuration, the compressor unit and the exhaust pipe are arranged in a well-balanced manner with the turbine unit interposed between them. As a result, peripheral components including the turbocharger can be balanced approximately equally in weight distribution in the vehicle width direction.

The invention makes it possible to give a turbocharged engine a well-balanced weight distribution.

DESCRIPTION OF SYMBOLS

Figure 1:
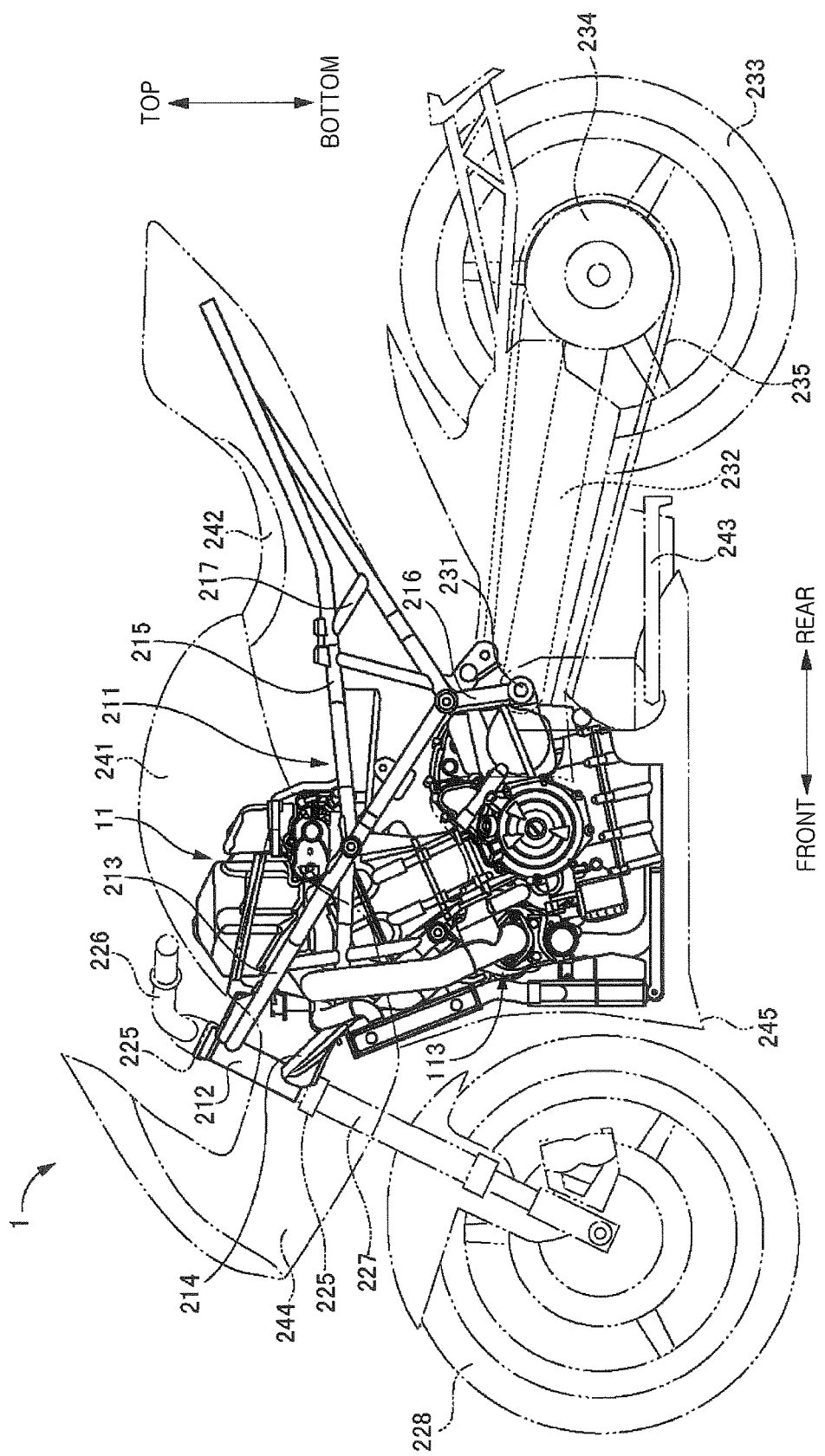
FIG. 1 is a left side view of a motor cycle according to an embodiment of the present invention.

1: Motorcycle (saddle-ridden vehicle)
12: Engine
13: Crank case
14: Cylinder
20: Crank shaft
24: Transmission mechanism
25: Clutch
113: Turbocharger
114: Turbine unit
115: Compressor unit
120: Electronically controlled throttle device (throttle device)
121B: Throttle valve
122: Drive motor
132: Muffler joint pipe (exhaust pipe)

DETAILED DESCRIPTION OF THE INVENTION

A preferred embodiment of the present invention will be hereinafter described with reference to the accompanying drawings. The forward, rearward, leftward, rightward, upward, and downward directions that will be used in the following description are defined for a rider who is sitting on the seat of a motorcycle.

The overall configuration of a motorcycle 1 according to an embodiment of the invention will be described with reference to FIG. 1, which is a left side view of the motorcycle 1.

A vehicle body frame 211 of the motorcycle 1 is constructed by, for example, joining plural steel pipes together. More specifically, the vehicle body frame 211 is equipped with a head pipe 212, a pair of main frames 213, a pair of down tubes 214, a pair of side frames 215, and a pair of pivot frames 216. The head pipe 212 is disposed at a top-front position of the motorcycle 1. The pair of main frames 213 are disposed at left and right positions of the motorcycle 1. Front end portions of the main frames 213 are connected to a top portion of the head pipe 212, and their rear portions extend down rearward. The pair of down tubes 214 are disposed at left and right positions of the motorcycle 1. Front end portions of the down tubes 214 are connected to a bottom portion of the head pipe 212, and their rear portions extend down rearward at a larger inclination than the rear portions of the main frames 213. The pair of side frames 215 are disposed at left and right positions of the motorcycle 1. Front end portions of the side frames 215 are connected to intermediate portions of the down tubes 214, respectively, and their rear portions extend rearward. The pair of pivot frames 216 are joined to rear end portions of the main frames 213, respectively. Reinforcement frames 217 are connected between the main frames 213, the down tubes 214, and the side frames 215.

A steering shaft (not shown) is inserted in the head pipe 212, and is provided with steering brackets 225 at its top and bottom. The top steering bracket 225 is provided with a handlebar 226. Top portions of a pair of (left and right) front fork pipes 227 are supported by the top and bottom steering brackets 225, and a front wheel 228 is supported by bottom end portions of the front fork pipes 227.

A front end portion of a swing arm 232 is disposed between and supported by the pair of (left and right) pivot frames 216 via a pivot shaft 231, and a rear wheel 233 is supported by a rear end portion of the swing arm 232. The shaft of the rear wheel 233 is provided with a driven sprocket 234 on which a chain 235 for transmitting motive power of an engine 12 (described later) is wound.

An engine unit 11 is disposed between the front wheel 228 and the rear wheel 233. The engine unit 11 is mainly disposed between the combination of the left main frame 213 and the left down tube 214 and the combination of the right main frame 213 and the right down tube 214 and is supported by these frames and tubes.

A fuel tank 241 is disposed over the engine unit 11, and a seat 242 is disposed in the rear of the fuel tank 241. Aside stand 243 is disposed at a left position of the motor cycle 1 in the bottom-rear of the engine unit 11. An upper cowl 244 is disposed at top-front position of the motorcycle 1. A lower cowl 245 mainly covers a bottom-front portion of the engine unit 11.

Figure 2:
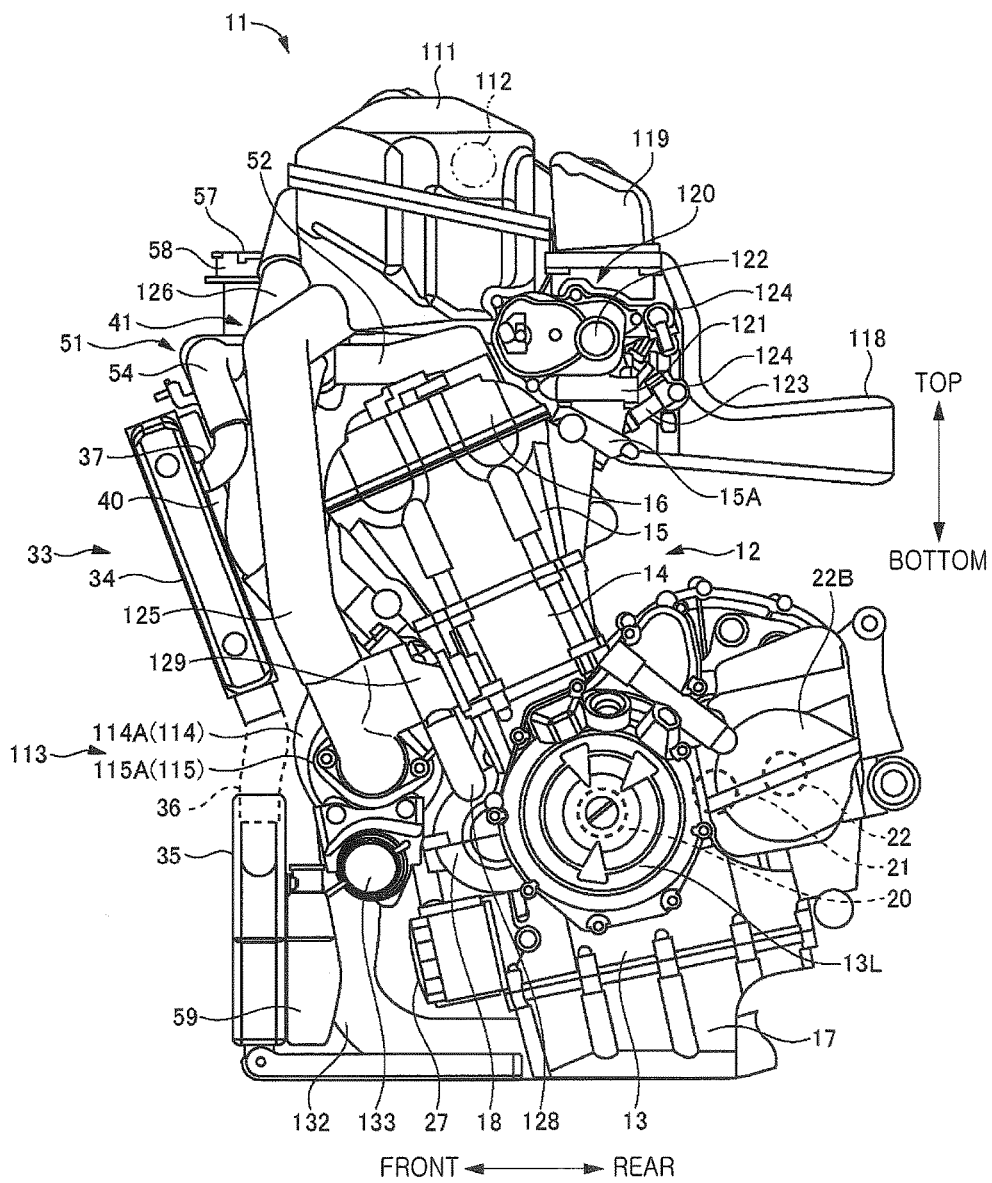
FIG. 2 is a left side view of an engine unit of the motor cycle according to the embodiment.
Figure 3:
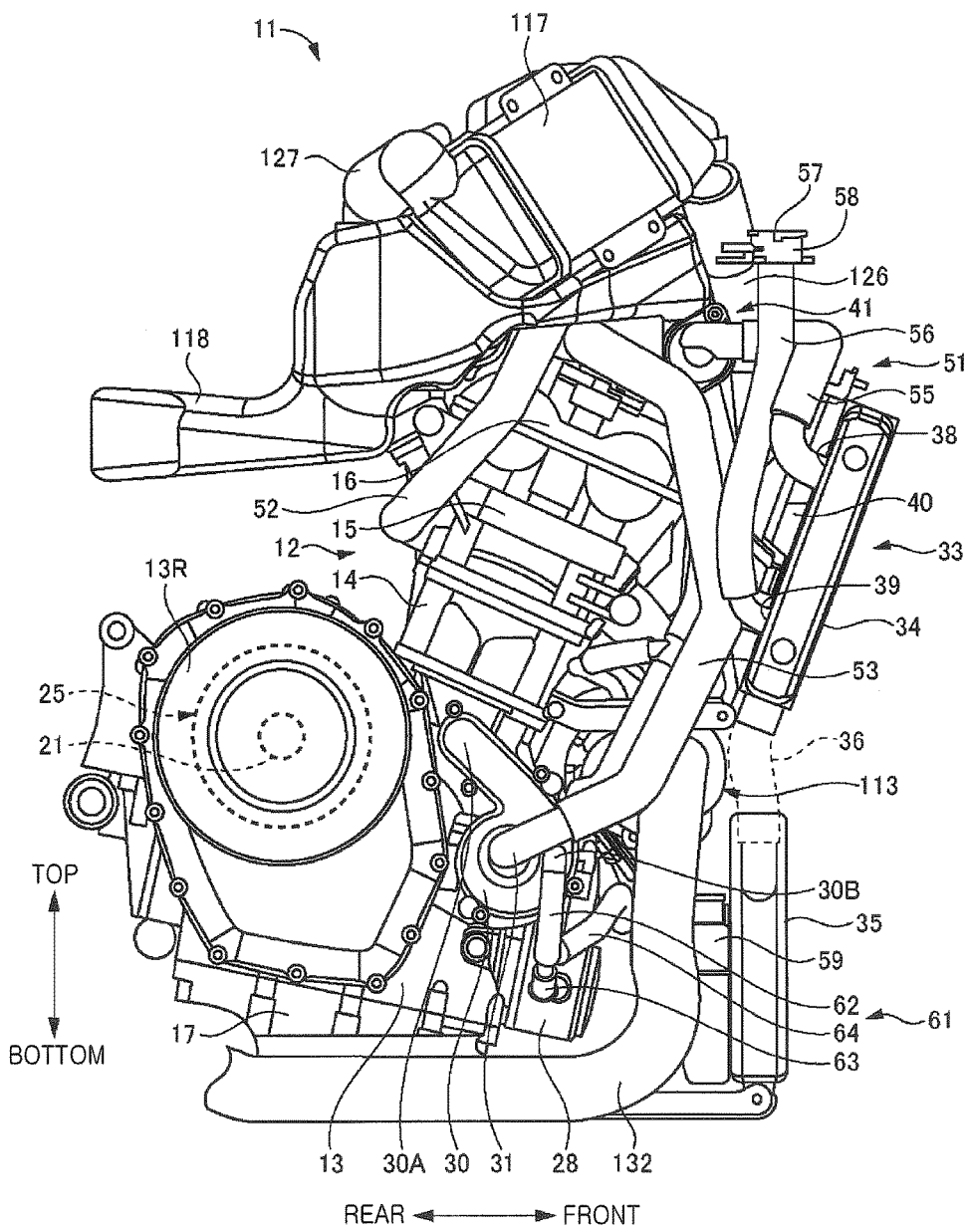
FIG. 3 is a right side view of the engine unit of the motor cycle according to the embodiment.
Figure 4:
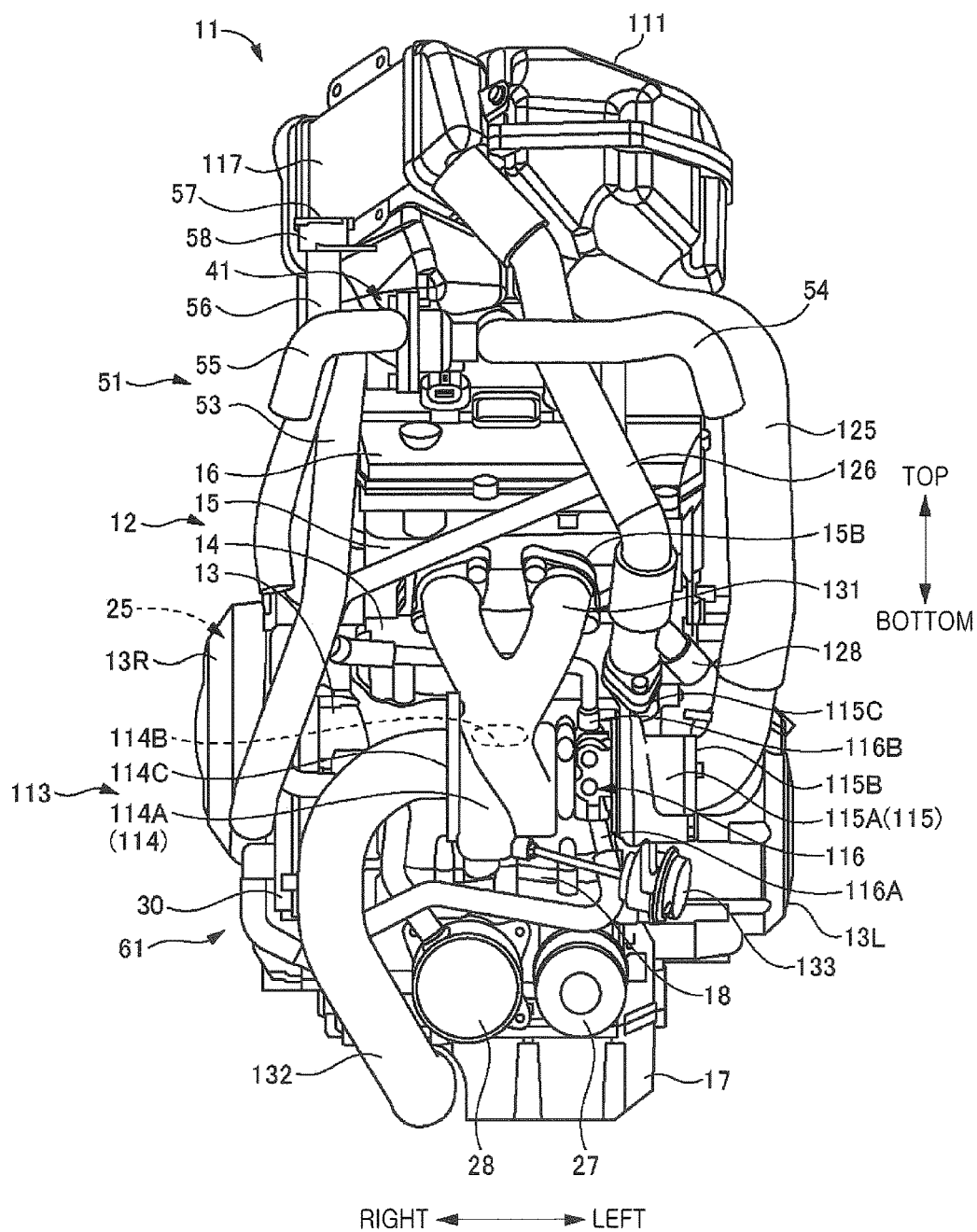
FIG. 4 is a front view of the engine unit (excluding a radiator unit) of the motor cycle according to the embodiment.
Figure 5:
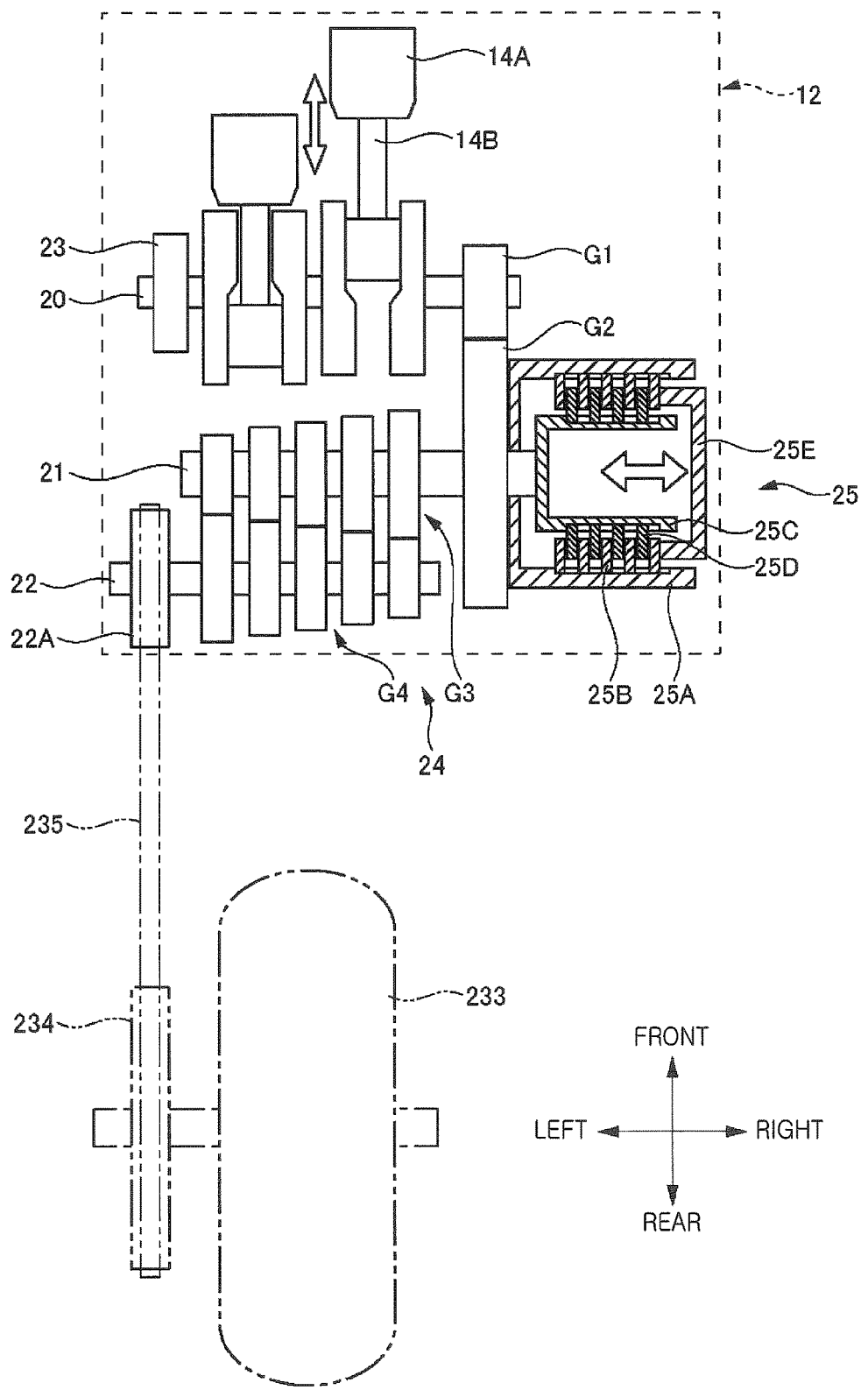
FIG. 5 is a front view schematically showing the internal structure of the engine of the motor cycle according to the embodiment.
Figure 6:
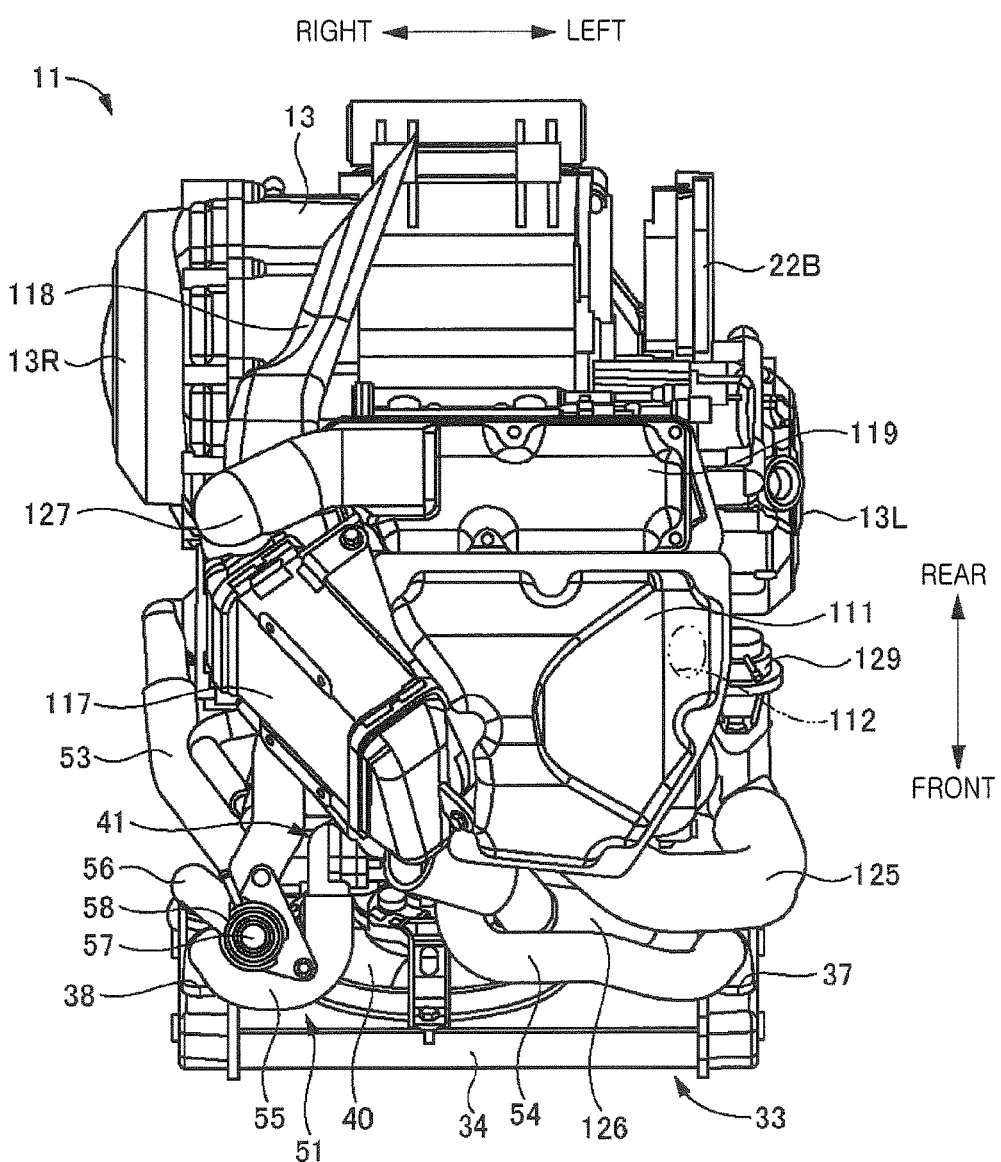
FIG. 6 is a plan view of the engine unit of the motor cycle according to the embodiment.
Figure 7:
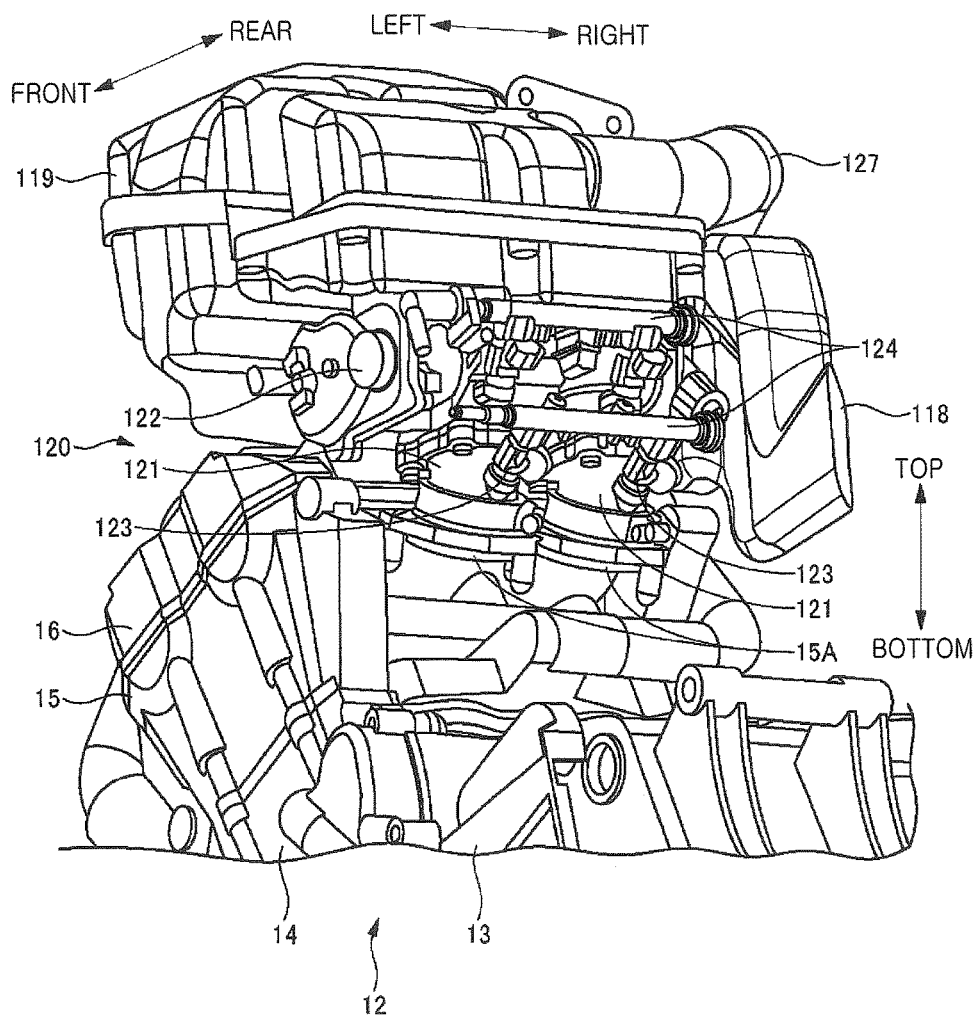
FIG. 7 is a perspective view, as viewed from the rear side, of the engine unit of the motor cycle according to the embodiment.
Figure 8:
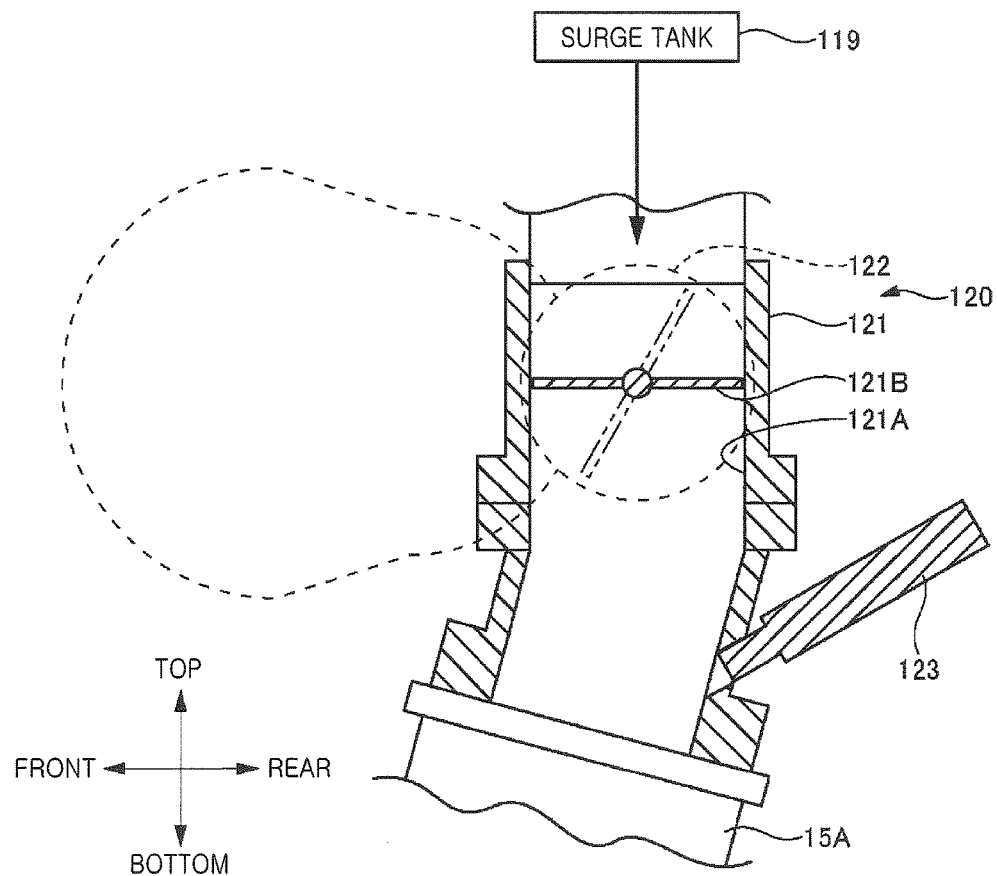
FIG. 8 is a sectional view schematically showing an electronically controlled throttle device of the motor cycle according to the embodiment.
Figure 9:
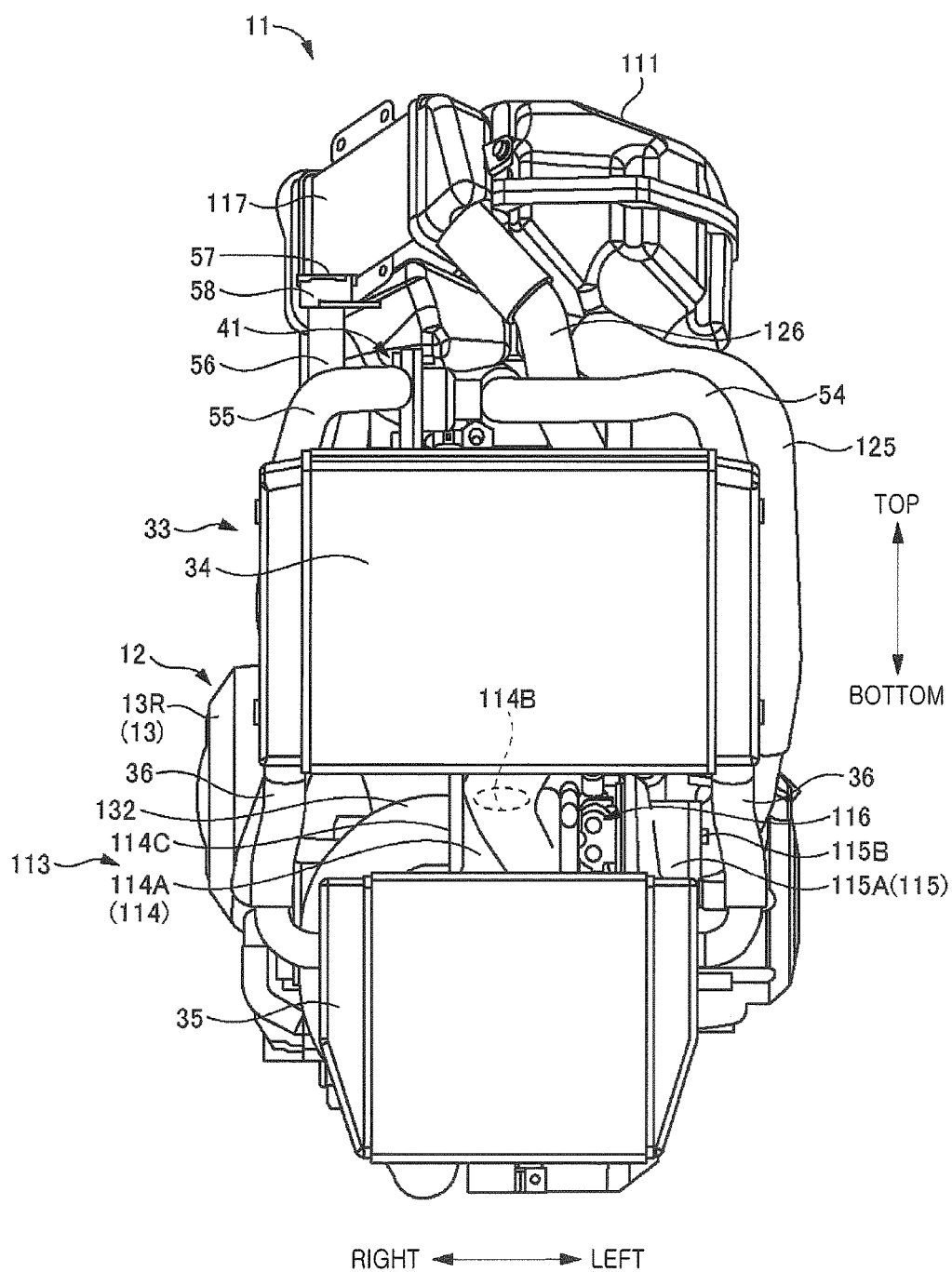
FIG. 9 is a front view of the engine unit (including the radiator unit) of the motor cycle according to the embodiment.
Figure 10:
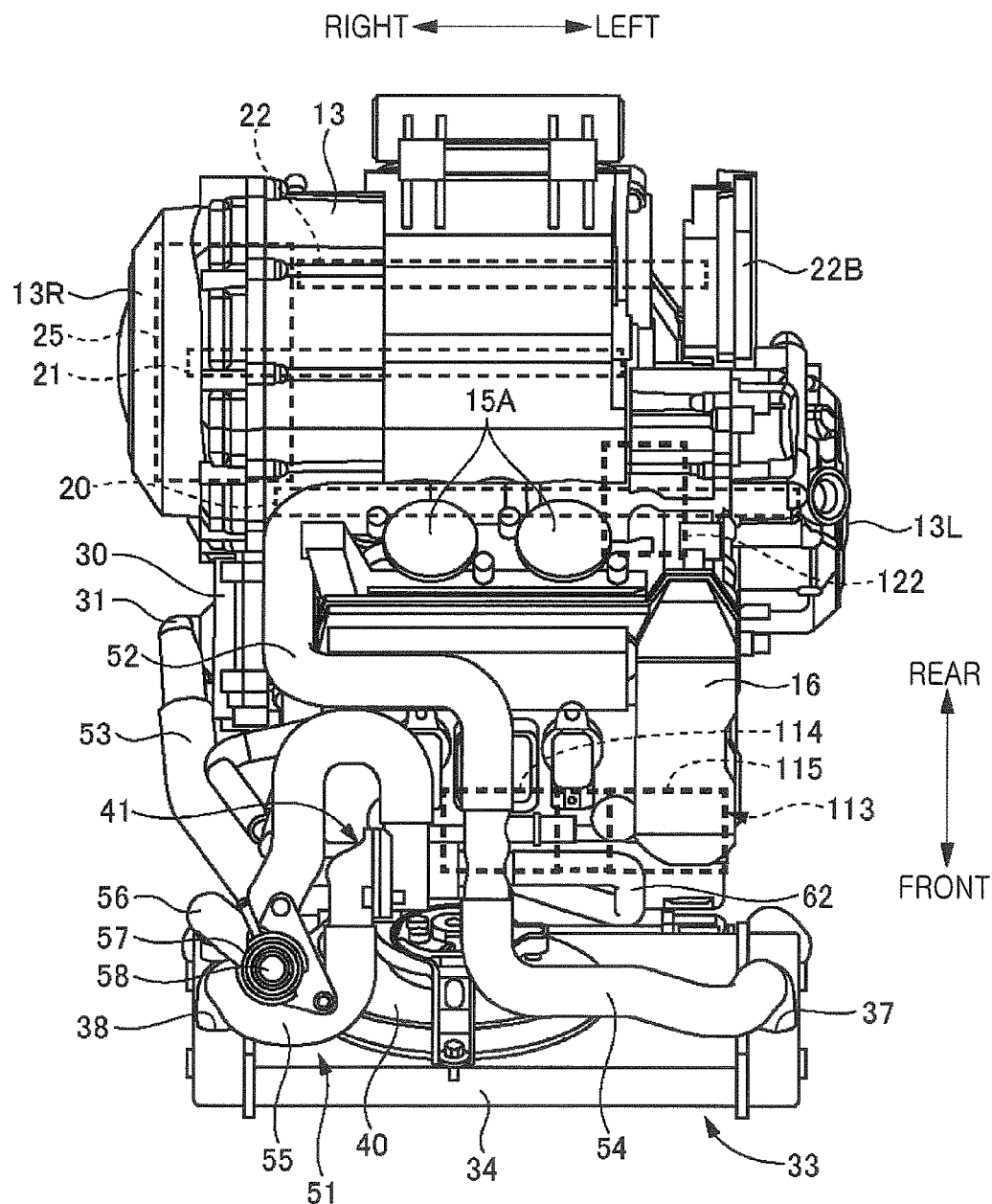
FIG. 10 is a plan view of the engine and a cooling system of the motor cycle according to the embodiment.
Figure 11:
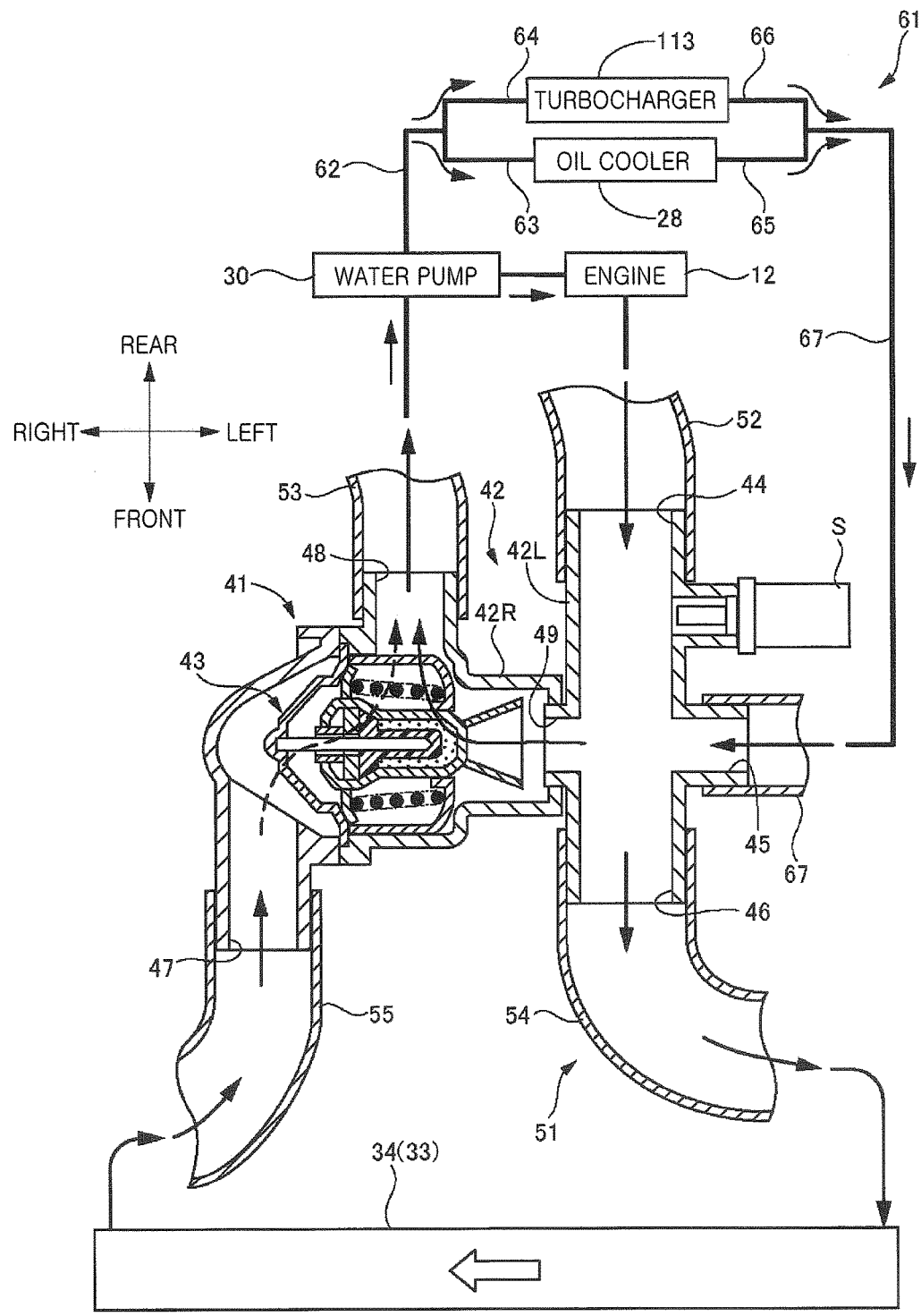
FIG. 11 is a sectional view schematically showing the cooling system of the engine unit of the motor cycle according to the embodiment.
Figure 12:
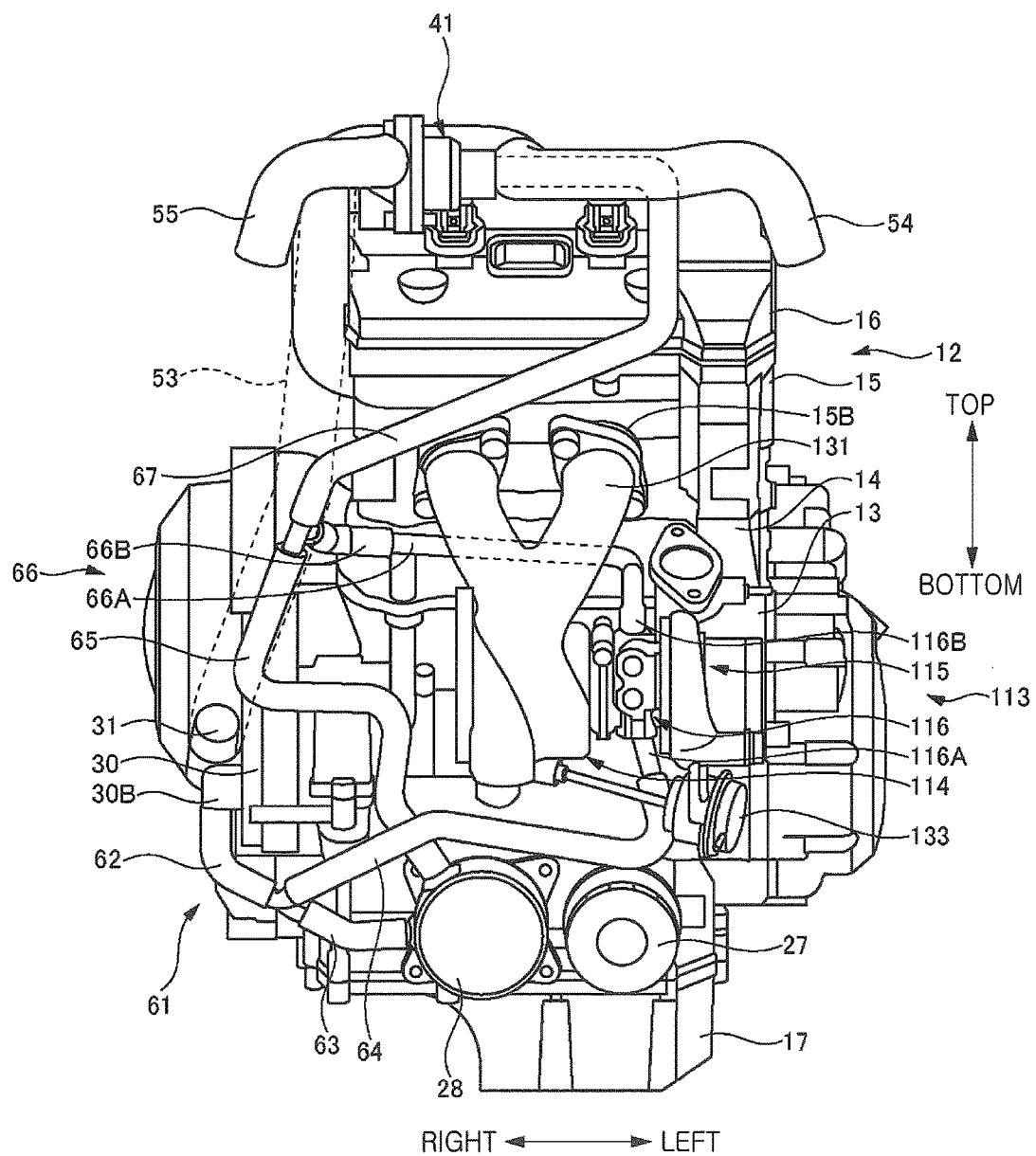
FIG. 12 is a front view of the engine and cooling tubing of the motor cycle according to the embodiment.

Next, the engine unit 11 will be described with reference to FIGS. 2-12. FIG. 2 is a left side view of the engine unit 11 and FIG. 3 is a right side view of the engine unit 11. FIG. 4 is a front view of the engine unit 11 (excluding a radiator unit 33) of the motor cycle. FIG. 5 is a front view schematically showing the internal structure of the engine 12. FIG. 6 is a plan view of the engine unit 11. FIG. 7 is a perspective view of the engine unit 11 as viewed from the rear side. FIG. 8 is a sectional view schematically showing an electronically controlled throttle device 120. FIG. 9 is a front view of the engine unit 11 (including the radiator unit 33). FIG. 10 is a plan view of the engine 12 and a cooling system. FIG. 11 is a sectional view schematically showing the cooling system of the engine unit 11. FIG. 12 is a front view of the engine 12 and cooling tubing 61.

The engine unit 11 is equipped with the engine 12, part of a drive system for transmitting motive power of the engine 12 to the rear wheel 233, a lubrication system for lubricating movable portions of the engine 12, an air intake system (including a turbocharger 113) for supplying an air-fuel mixture to the engine 12, part of an exhaust system for discharging exhaust gas generated by burning of an air-fuel mixture from the engine 12, and a cooling system for cooling the engine 12 etc.

The engine 12 used in the embodiment is, for example, a water-cooling, parallel 2-cylinder, 4-cycle gasoline engine. As shown in FIGS. 2-4, the engine 12 has a crank case 13, cylinders 14 disposed above the crank case 13, a cylinder head 15 disposed on top of the cylinders 14, and a cylinder head cover 16 disposed on top of the cylinder head 15. An oil pan 17 for storing engine oil is disposed under the crank case 13.

The cylinders 14 are erected from the top surface of the crank case 13 so as to extend up forward. That is, the cylinders 14 have cylinder axial lines that extend up forward. A piston 14A is disposed inside each cylinder 14 so as to be able to reciprocate obliquely in the vertical direction (see FIG. 5). A rear portion of the cylinder head 15 is provided with a pair of (left and right) air intake ports 15A (see FIG. 2), and a front portion of the cylinder head 15 is provided with a pair of (left and right) exhaust ports 15B (see FIG. 4).

The part of the drive system of the engine unit 11 is mainly disposed in the crank case 13. As shown in FIG. 5, a crank shaft 20, a counter shaft 21, and a drive shaft 22 are arranged rearward in this order and housed in the crank case 13. The shafts 20-22 extend parallel with each other in the vehicle width direction (left-right direction) and are supported rotatably in the crank case 13. A balance shaft (not shown) for suppressing vibration produced by the rotation of the crank shaft 20 (i.e., the movements of the pistons 14A) are also disposed in the crank case 13. The balance shaft is disposed in front of the crank shaft 20 and housed in a balancer room 18 (see FIG. 2), which is formed by swelling part of a front wall of the crank case 13 forward and is thus integral with the crankcase 13.

The crank shaft 20 is disposed below the cylinders 14 (pistons 14A). The pair of (left and right) pistons 14A are linked to intermediate portions, in the axial direction, of the crank shaft 20 by a pair of (left and right) connecting rods 14B. A magnet 23 for power generation by electromagnetic induction is attached to a left end portion of the crank shaft 20, and is covered with a magnet cover 13L which is disposed on the left of the crank case 13 (see FIG. 2). On the other hand, a primary drive gear G1 is fixed to a right end portion of the crank shaft 20.

A primary driven gear G2 which is in mesh with the primary drive gear G1 is supported rotatably by a right end portion of the counter shaft 21. A left portion of the counter shaft 21 is provided with plural transmission gears G3.

The drive shaft 22 is provided with plural transmission gears G4 to engage with the plural transmission gears G3. The transmission gears G3 and G4 constitute a transmission mechanism 24 together with a shift mechanism (not shown). A drive sprocket 22A is fixed to a left end portion of the drive shaft 22. A chain 235 is stretched between the drive sprocket 22A and the driven sprocket 234. The drive sprocket 22A is covered with a sprocket cover 22B (see FIG. 2).

A right end portion (located "on one side in the vehicle width direction" (a term used in the claims)) of the counter shaft 21 is provided with a clutch 25 for enabling or disabling motive power transmission between the crank shaft 20 and the transmission mechanism 24. A shift manipulation can be performed smoothly by disabling the transmission of power by the clutch 25. The clutch 25 is covered with a clutch cover 13R (see FIG. 3) which is disposed on the right of the crank case 13.

The clutch 25, which is, for example, a wet multiplate clutch, is equipped with a clutch housing 25A, plural clutch plates 25B, a clutch hub 25C, plural friction plates 25D, and a pressure plate 25E.

The clutch housing 25A is fixed to a right side surface of the primary driven gear G2. The clutch plates 25B are disposed inside the clutch housing 25A so as to be movable in the left-right direction. The clutch housing 25A and the clutch plates 25B are rotated together with the primary driven gear G2.

The clutch hub 25C is attached to a right end portion of the counter shaft 21 and disposed inside the clutch housing 25A. The friction plates 25D are disposed outside the clutch hub 25C so as to be movable in the left-right direction. The clutch hub 25C and the friction plates 25D are rotated together with the counter shaft 212.

The clutch plates 25B and the friction plates 25D are arranged alternately and placed on each other. Urged by a clutch spring (not shown), the pressure plate 25E is pushed toward the clutch housing 25A. As a result, all of the clutch plates 25B are pressed against all of the friction plates 25D.

The crank shaft 20 is rotated by the pistons 14A which reciprocate in the respective cylinders 14. The rotating crank shaft 20 rotates the clutch housing 25A via the gears G1 and G2. At this time, the clutch hub 25C is rotated together with the clutch housing 25A by friction force occurring between the clutch plates 25B and the friction plates 25D. In this manner, the rotation of the crank shaft 20 is transmitted to the counter shaft 21, as a result of which the drive shaft 22 is rotated via the transmission mechanism 24. The rotating drive shaft 22 (drive sprocket 22A) rotates the rear wheel 233 (driven sprocket 234) via the chain 235.

When a rider manipulates a clutch lever (not shown), the pressure plate 25E is moved rightward, that is, away from the clutch housing 25A. As a result, gaps are formed between the clutch plates 25B and the friction plates 25D, whereby the transmission of motive power from the crank shaft 20 to the transmission mechanism 24 is disabled.

As shown in FIGS. 2-4, the lubrication system of the engine unit 11 is equipped with an oil pump (not shown), an oil filter 27, and a water-cooling type oil cooler 28. The oil pump pumps up engine oil stored in the oil pan 17 of the engine 12 and supplies it to individual portions of the engine 12. The oil filter 27 filters engine oil being supplied to the engine 12. The oil cooler 28 cools engine oil being supplied to the engine 12. As shown in FIG. 4, the oil filter 27 and the oil cooler 28 are arranged in the left-right direction (vehicle width direction) on the two respective sides of the vertical center line in front of a bottom end portion of the engine 12 (below the balancer room 18). More specifically, the oil filter 27 and the oil cooler 28 are disposed on the left and right of the center of the crank case 13, respectively.

As shown in FIGS. 2-4, the air intake system of the engine unit 11 is equipped with an air cleaner 111, the turbocharger 113, an intercooler 117, an exhaust wind duct 118, a surge tank 119, the electronically controlled throttle device 120, and a pair of (left and right) injectors 123.

As shown in FIGS. 4 and 6, the air cleaner 111 is disposed on the top-left of the engine 12. The air cleaner 111, which is a device for filtering air that is taken in from outside, is provided with an air filter (not shown) inside. Although in FIGS. 2 and 6 an air inlet 112 of the air cleaner 111 is indicated schematically by a two-dot chain line, the position of the air inlet 112 may be set as appropriate. The air inlet 112 is provided with an air duct (not shown) for guiding external air to the air cleaner 111.

As shown in FIGS. 2-4, the turbocharger 113 is disposed in front of the engine 12 above the oil cooler 28 etc. (Part of) a top portion of the turbocharger 113 is disposed above the balancer room 18. The turbocharger 113 compresses air for burning to be supplied to the engine 12.

As shown in FIGS. 2 and 4, the turbocharger 113 is equipped with a turbine unit 114, a compressor unit 115, and a bearing unit 116. The turbine unit 114 is driven by exhaust gas of the engine 12. The compressor unit 115 compresses air receiving drive force from the turbine unit 114. The bearing unit 116 has a function of cooling the turbocharger 113 by passage of cooling water through it.

The turbine unit 114 is disposed approximately at a front-center (in the left-right direction) position of the engine 12. The turbine unit 114 includes a turbine wheel (not shown) which is supported rotatably inside a turbine housing 114A which is approximately cylindrical. An exhaust gas inflow portion 114B is formed above the turbine housing 114A, and an exhaust gas outflow portion 114C is formed on the right of the turbine housing 114A.

The compressor unit 115 is disposed on the left ("on the other side in the vehicle width direction" (a term used in the claims)) of the turbine unit 114. The compressor unit 115 includes a compressor impeller (not shown) which is supported rotatably inside a compressor housing 115A which is approximately cylindrical. An air inflow portion 115B is formed on the left of the compressor housing 115A, and an air outflow portion 115C is formed over the compressor housing 115A. The compressor unit 115 may be disposed on the right of the turbine unit 114.

As shown in FIG. 4, the bearing unit 116 is disposed between the turbine unit 114 and the compressor unit 115. The bearing unit 116 includes a bearing (not shown) which supports the turbine wheel and the compressor impeller pivotally at an intermediate portion. Engine oil is supplied to the bearing unit 116 by driving the oil pump. And cooling water is supplied to the bearing unit 116 by driving a water pump 30 (described later).

As shown in FIGS. 2 and 4, a waste gate valve 133 is disposed under the turbocharger 113 (in front of the balancer room 18). The waste gate valve 133 adjusts the pressure (boost pressure) of air compressed by the turbocharger 113.

As shown in FIGS. 3, 4, and 6, the intercooler 117 is disposed on the top-right of the engine 12. The intercooler 117 is a device for cooling air that has been compressed and increased in temperature by the compressor unit 115 of the turbocharger 113. The exhaust wind duct 118 for discharging, to the outside, air (exhaust wind) that has passed through the intercooler 117 is disposed in the vicinity of the intercooler 117. As seen from FIGS. 2 and 6, the surge tank 119 is disposed on the top-rear of the engine 12. The surge tank 119 is a device for adjusting a flow of air that has been cooled by the intercooler 117. As shown in FIG. 6, a connecting pipe 127 connects the intercooler 117 and the surge tank 119. The connecting pipe 127 is disposed on the top-right of the engine 12.

As shown in FIGS. 4 and 6, an air intake pipe 125 connects the air cleaner 111 and the compressor unit 115 (air inflow portion 115B) of the turbocharger 113. The air intake pipe 125 is disposed on the front-left of the engine 12. An air outlet pipe 126 connects the compressor unit 115 (air outflow portion 115C) of the turbocharger 113 and the intercooler 117. The air outlet pipe 126 is disposed on the front-left of the engine 12 on the right of the air intake pipe 125. An air bypass passage 128 which connects the air intake pipe 125 and the air outlet pipe 126 is disposed in the vicinity of the compressor unit 115 (see FIGS. 2 and 4). An air bypass valve 129 for switching between passage and shutoff of the air bypass passage 128 is disposed at a halfway position of the air bypass passage 128 (see FIGS. 2 and 6).

As shown in FIGS. 2 and 7, the electronically controlled throttle device 120 is equipped with a pair of (left and right) throttle bodies 121, a drive motor 122, a throttle sensor (not shown), and a controller (not shown). Since the pair of throttle bodies 121 are approximately the same in structure, only one of them will mainly be described below.

Each throttle body 121 is disposed in the top-rear of the associated cylinder 14 between the surge tank 119 and the associated air intake port 15A of the engine 12. As shown in FIG. 8, an intake air passage 121A which connects the surge tank 119 and the air intake port 15A is formed inside the throttle body 121. The throttle body 121 is equipped with a throttle valve 121B for varying the opening angle of the intake air passage 121A. The throttle body 121 is urged in the direction of closing the intake air passage 121A by a return spring (not shown).

As shown in FIGS. 2 and 7, the drive motor 122 is disposed in the top-rear of the cylinders 14 on the left of the left-hand throttle body 121. More specifically, the drive motor 122 is disposed in the top-rear of the cylinder head cover 16. Connected to the pair of throttle valves 121B via, for example, a gear train, the drive motor 122 drives (rotates) the pair of throttle valves 121B (see FIG. 8). The throttle sensor detects the amount of a manipulation of the throttle grip (not shown) by a rider. The controller drive-controls the drive motor 122 on the basis of a detection result of the throttle sensor.

The pair of (left and right) injectors 123 are devices for injecting fuel into the respective intake airports 15A of the engine 12. The injectors 123 are attached to the rear surfaces of the throttle bodies 121, respectively. The injectors 123 are connected to the fuel tank 241 via delivery pipes 124.

As shown in FIG. 4, the exhaust system of the engine unit 11 is equipped with an exhaust pipe 131, a muffler joint pipe 132, a muffler (not shown), etc.

The exhaust pipe 131 connects the engine 12 and the turbocharger 113. The exhaust pipe 131 branches off on one side (upstream side) into two pipes which are connected to the pair of (left and right) exhaust ports 15B, respectively. On the other side (downstream side), the exhaust pipe 131 (single pipe) is connected to the exhaust gas inflow portion 114B of the turbine unit 114. In the embodiment, the exhaust pipe 131 is integral with the turbine housing 114A of the turbine unit 114. Alternatively, the exhaust pipe 131 may be a member that is separate from the turbine housing 114A and is connected to the turbine housing 114A.

The muffler joint pipe 132, which connects the turbocharger 113 and the muffler, serves to discharge exhaust gas of the engine 12 to the outside. One end portion (upstream end portion) of the muffler joint pipe 132 is connected to the exhaust gas outflow portion 114C of the turbine unit 114. The other end portion (downstream end portion) of the muffler joint pipe 132 passes by a bottom-right portion of the engine 12 and extends rearward toward the muffler (see FIG. 3). That is, the muffler joint pipe 132 is disposed on the right ("on the one side in the vehicle width direction" (a term used in the claims)) of the turbine unit 114.

As described above, the compressor unit 115 and the muffler joint pipe 132 are disposed on the left and right of the turbine unit 114 in a well-balanced manner (see FIG. 4). As a result, the components including the turbocharger 113 can be arranged so as to be balanced approximately equally in weight in the left-right direction (vehicle width direction).

Exhaust gas of the engine 12 is supplied from each exhaust port 15B to the turbine unit 114 (the inside of the turbine housing 114A) of the turbocharger 113 via the exhaust pipe 131. The exhaust gas supplied to the inside of the turbine housing 114A rotates the turbine wheel. Then the exhaust gas is output from the exhaust gas outflow portion 114C, passes through the muffler joint pipe 132, and is discharged to the outside from the muffler. The turbine unit 114 is equipped with a bypass valve (not shown) for causing part of exhaust gas to flow from the exhaust pipe 131 to the muffler joint pipe 132 without passing through the turbine housing 114A. The above-mentioned waste gate valve 133 adjusts the inflow rate (boost pressure) of exhaust gas to be supplied to the turbine unit 114 by adjusting the degree of opening of the bypass valve.

The turbine wheel of the turbine unit 114 is rotated by exhaust gas that is supplied to the inside of the turbine housing 114A. The rotation power of the turbine wheel rotates the compressor impeller of the compressor unit 115 via the bearing unit 116.

Air for engine burning is supplied from the air cleaner 111 to the compressor unit 115 (the inside of the compressor housing 115A) of the turbocharger 113 via the air intake pipe 125. The air supplied to the inside of the compressor housing 115A is compressed by the compressor impeller that is rotating. The compressed air is output from the air outflow portion 115C, passes through the air outlet pipe 126, and is supplied to the intercooler 117. The compressed air is cooled by the intercooler 117, passes through the connecting pipe 127, the surge tank 119, and the throttle bodies 121 in this order, and supplied to the air intake ports 15A of the engine 12. The electronically controlled throttle device 120 adjusts the amount of air that is supplied to the engine 12 by controlling the opening angle of the throttle valves 121B using the drive motor 122.

As shown in FIG. 3, the cooling system of the engine unit 11 is equipped with a water jacket (not shown), the water pump 30, the radiator 33, a cooling water flow control unit 41, main tubing 51, and the cooling tubing 61.

The water jacket is provided for the cylinders 14 and the cylinder head 15, which are cooled by cooling water flowing through the water jacket.

The water pump 30 is attached to a right-hand portion of the crank case 13 (see FIG. 4), and is provided with a pump inlet 31. The water pump 30 is formed with a supply portion 30A for supplying cooling water to the water jacket. The water pump 30 is provided with a cooling water discharge outlet 30B at a front position. The water pump 30 operates using rotation of the crankshafts and thereby feeds cooling water to the engine 12 etc.

As shown in FIGS. 2, 3, and 9, the radiator 33 is disposed in front of the engine 12 and the turbocharger 113. The radiator 33 cools cooling water that is supplied from the engine 12 by receiving a traveling wind or driving a radiator fan 40.

The radiator 33 has a top radiator 34 and a bottom radiator 35, each of which is approximately shaped like a rectangular parallelepiped that is thin in the front-rear direction and long in the left-right direction. The top radiator 34 and the bottom radiator 35 are connected to each other by a pair of (left and right) connecting hoses 36.

The top radiator 34 is narrower than the engine 12 (crank case 13) in the left-right direction (see FIG. 9), and is supported by the vehicle body frame 211 so as to be inclined forward (see FIG. 2 etc.). The rear surface of the top radiator 34 is formed with a radiator inlet 37 at a top-left position and with a radiator outlet 38 at a top-right position (see FIG. 6). The rear surface of the top radiator 34 is provided with the radiator fan 40 at a position that is a little deviated rightward from the vertical center line (see FIG. 6).

The bottom radiator 35 is narrower than the top radiator 34 in the left-right direction (see FIG. 9), and is supported by the engine 12 via a bracket (not shown) so as to be oriented vertically (see FIG. 2 etc.).

As shown in FIG. 3, the rear surface of the top radiator 34 is formed with, at a bottom-right position, a cooling water supply inlet 39 to which a water injection hose 56 extending upward is connected. A top end portion of the water injection hose 56 is provided with a cooling water injection portion 58 having a cooling water injection opening 57. A reservoir tank 59 is connected to the radiator 33 via a reserve tube (not shown).

As shown in FIGS. 9 and 10, the cooling water flow control unit 41 is disposed above the cylinder head cover 16 at a front-right position. The cooling water flow control unit 41 is provided to adjust the flow rate of cooling water to flow through the radiator 33 according to the cooling water temperature and thereby keep the cooling water temperature at a proper value. As shown in FIG. 11, the cooling water flow control unit 41 is equipped with a thermostat housing 42 and a thermostat 43.

A left housing 42L of the thermostat housing 42 is formed with a first cooling water inlet 44 at a rear position, and with a second cooling water inlet 45 at a left position. The left housing 42L is also formed with a cooling water outlet 46 at a front position. A water temperature sensor S for detecting the temperature of cooling water flowing inside the left housing 42L is attached to the left housing 42L at a rear-left position.

A right housing 42R of the thermostat housing 42 is formed with a cooling water return inlet 47 at a front position, and with a cooling water outlet 48 at a rear position. A cooling water bypass passage 49 is formed between the left housing 42L and the right housing 42R.

The thermostat 43 is disposed inside the right housing 42R. The thermostat 43 adjusts the degree of opening of the flow passage between the cooling water return inlet 47 and the cooling water outlet 48 and the degree of opening of the cooling water bypass passage 49 according to the temperature of cooling water.

As shown in FIGS. 10 and 11, the main tubing 51 is provided to have the cooling water flow control unit 41 and the water pump 30 communicate with each other and to supply cooling water that has cooled the engine 12 to the water pump 30 and the radiator 33. That is, the water pump 30, the radiator 33, the cooling water flow control unit 41, and the main tubing 51 constitute an engine cooling water circulation structure for circulating cooling water for cooling the engine 12.

The main tubing 51 has a cylinder outlet hose 52, a water pump inlet hose 53, a radiator inlet hose 54, and a radiator outlet hose 55. Except the cylinder outlet hose 52, the main tubing 51 is disposed in a concentrated manner in the space between the engine 12 and the radiator 33 (see FIGS. 2 and 3). The hoses 52-55 are made of a flexible synthetic resin, for example.

The cylinder outlet hose 52 connects an outlet portion (not shown) of the water jacket and the first cooling water inlet 44. The water pump inlet hose 53 connects the cooling water outlet 48 and the pump inlet 31 of the water pump 30. The radiator inlet hose 54 connects the cooling water outlet 46 and the radiator inlet 37 of the top radiator 34. The radiator outlet hose 55 connects the radiator outlet 38 of the top radiator 34 and the cooling water return inlet 47.

As shown in FIGS. 11 and 12, the cooling tubing 61 is provided to supply cooling water that has cooled the oil cooler 28 or the turbocharger 113 to the water pump 30 and the radiator 33. That is, the water pump 30, the radiator 33, the cooling water flow control unit 41, and the cooling tubing 61 constitute a turbocharger cooling water circulation structure for circulating cooling water for cooling the oil cooler 28 or the turbocharger 113.

The cooling tubing 61 has a branching tube 62, a first inflow tube 63, a second inflow tube 64, a first outflow tube 65, a second outflow tube 66, and a merging tube 67. The cooling tubing 61 is disposed in a concentrated manner in the space between the engine 12 and the radiator 33 (see FIG. 3). Although it is preferable that the branching tube 62, the first inflow tube 63, the second inflow tube 64, the first outflow tube 65, and the merging tube 67 be hoses made of a flexible synthetic resin, they may be metal pipes.

An upstream end portion of the branching tube 62 is connected to the cooling water outlet 30B of the water pump 30. A downstream end portion of the branching tube 62 branches into the first inflow tube 63 and the second inflow tube 64. The first inflow tube 63 connects the branching tube 62 to a right surface portion of the oil cooler 28. The second inflow tube 64 connects the branching tube 62 to a bottom portion of the turbocharger 113 (bearing unit 116). That is, the second inflow tube 64 is routed parallel with the first inflow tube 63. A downstream end portion of the second inflow tube 64 is connected to a lower inflow pipe 116A which projects from the bottom surface of the bearing unit 116.

The first outflow tube 65 extends up rightward from the oil cooler 28. The second outflow tube 66 extends rightward from a top portion of the bearing unit 116. The first outflow tube 65 and the second outflow tube 66 are routed parallel with each other and merge together above the turbocharger 113 etc. The second outflow tube 66 has a turbocharger outlet pipe 66A and a turbocharger outlet hose 66B. An upstream end portion of the turbocharger outlet pipe 66A is connected to an upper outflow pipe 116B which projects from the top surface of the bearing unit 116. The turbocharger outlet hose 66B is connected to a downstream end portion of the turbocharger outlet pipe 66A. Although it is preferable that turbocharger outlet pipe 66A be made of a metal or the like and the turbocharger outlet hose 66B be made of a synthetic resin or the like, the whole of the second outflow tube 66 may be a metal pipe or a synthetic resin hose.

The first outflow tube 65 and the second outflow tube 66 (turbocharger outlet hose 66B) merge into the merging tube 67. The merging tube 67 connects the second cooling water inlet 45 and the merging portion of the outflow tubes 65 and 66. The merging tube 67 extends up leftward.

Now, how cooling water flows will be described with reference to FIGS. 11 and 12. Upon a start of the engine 12 (water pump 30), cooling water is fed from the supply portion 30A to the water jacket of the engine 12 and cools the cylinders 14 and the cylinder head 15. The cooling water that has been used for cooling the engine 12 passes through the cylinder outlet hose 52 and flows into the cooling water flow control unit 41 (left housing 42L).

Upon the start of the water pump 30, cooling water is discharged from the cooling water discharge outlet 30B, flows through the branching tube 62, and is divided to flow into the inflow tubes 63 and 64. Cooling water flowing through the first inflow tube 63 is supplied to the oil cooler 28 and cools engine oil there. On the other hand, cooling water flowing through the second inflow tube 64 is supplied to the bearing unit 116 and cools a turbine wheel bearing etc. there.

The cooling water that has been used for cooling the oil cooler 28 passes through the first outflow tube 65, and the cooling water that has been used for cooling the turbocharger 113 passes through the second outflow tube 66. The cooling water streams flowing through the respective outflow tubes 65 and 66 merge together into cooling water passing through the merging tube 67, which flows into the left housing 42L.

The thermostat 43 of the cooling water flow control unit 41 controls the flow of the cooling water according to the temperature of cooling water that has flown into the thermostat housing 42.

If, for example, the cooling water temperature is lower than or equal to a reference temperature T1 (e.g., immediately after a start of the engine 12), the thermostat 43 fully closes the flow passage between the cooling water return inlet 47 and the cooling water outlet 48 and fully opens the cooling water bypass passage 49. At this time, cooling water that has flown in through the cooling water inlets 44 and 45 does not flow into the radiator 33 but flows into the right housing 42R from the left housing 42L via the cooling water bypass passage 49. This cooling water passes through the water pump inlet hose 53 and supplied to the water pump 30. In this manner, a warm-up operation of the engine 12 can be performed efficiently.

If, for example, the cooling water temperature is higher than the reference temperature T1 and lower than or equal to a prescribed reference temperature T2 (T2>T1), the thermostat 43 increases the sectional area of the flow passage between the cooling water return inlet 47 and the cooling water outlet 48 and decreases the sectional area of the cooling water bypass passage 49. Thus, the flow rate of cooling water passing through the radiator 33 is increased as the cooling water temperature increases.

More specifically, cooling water flows out of the left housing 42L into the top radiator 34 via the radiator inlet hose 54. Part of the cooling water is cooled by the top radiator 34, passes through the radiator outlet hose 55, and flows into the right housing 42R. The other part of the cooling water that has flown into the top radiator 34 is supplied to the bottom radiator 35 via the one connecting hose 36 etc. and cooled there. The cooling water that has been cooled by the bottom radiator 35 returns to the top radiator 34 via the other connecting hose 36 etc. and then flows into the right housing 42R via the radiator outlet hose 55.

On the other hand, the cooling water that has flown through the cooling water bypass passage 49 merges, inside the right housing 42R, with the cooling water that has flown through the radiator 33, and is returned to the water pump 30 via the water pump inlet hose 53.

If, for example, the cooling water temperature is higher than the reference temperature T2, the thermostat 43 fully opens the flow passage between the cooling water return inlet 47 and the cooling water outlet 48 and fully closes the cooling water bypass passage 49. At this time, no cooling water flows out of the left housing 42L into the cooling water bypass passage 49 and, instead, cooling water flows out of the left housing 42L into the radiator 33 and is returned to the water pump 30 via the right housing 42R.

Incidentally, in general, turbocharged engines require a high-power drive motor because a throttle valve position control is performed for compressed air. Thus, in the engine 12, the drive motor 122 is made heavier than in natural aspiration engines. Furthermore, in turbocharged engines which are higher in output power than natural aspiration engines, it is necessary to increase the clutch capacity (i.e., pressure resistance). Thus, in the engine 12, the clutch 25 is made heavier because of weight increase of the clutch 25 due to, for example, increase in the number of clutch plates 25B and the friction plates 25D or their diameter. In view of the above, in the motorcycle 1 according to the embodiment, relatively heavy components such as the drive motor 122 and the clutch 25 are arranged in a well-balanced manner.

More specifically, as shown in FIGS. 4 and 10, the clutch 25 is disposed on the right side ("on the one side in the vehicle width direction" (a term used in the claims)) in the engine 12 (inside the crank case 13). On the other hand, the compressor unit 115 of the turbocharger 113 and the drive motor 122 of the electronically controlled throttle device 120 is disposed on the left ("on the other side in the vehicle width direction" (a term used in the claims)) of the engine 12. In this configuration, the compressor unit 115 and the drive motor 122 are located on the side opposite to the clutch 25 in the left-right direction (vehicle width direction). That is, the clutch 25, the compressor unit 115, and the drive motor 122 are arranged so that the engine unit 11 is rendered approximately in a balanced state in terms of mechanics. As a result, the engine unit 11 can be balanced approximately equally in weight distribution in the left-right direction.

As shown in FIGS. 2 and 10, the turbocharger 113 is disposed in front of the engine 12 (cylinders 14) and the drive motor 122 and the clutch 25 are disposed in the rear of the engine 12 (cylinders 14). More specifically, the clutch 25 is disposed adjacent to the right end portion of the counter shaft 21 which is supported pivotally in the rear of the crank shafts 20 (see FIG. 5). That is, inside the crankcase 13, the clutch 25 is disposed in the rear of the crank shafts 20. In this configuration, the drive motor 122 is located at such a position as to be distant from the turbocharger 113 with the engine 12 (cylinders 14) interposed between them. This suppresses a phenomenon that that heat of the turbocharger 113 adversely affects the drive motor 122. Furthermore, the turbocharger 113 (compressor unit 115), the drive motor 122, and the clutch 25 can be arranged in a well-balanced manner in a range that is centered by the cylinders 14.

Although in the motorcycle 11 according to the embodiment the drive motor 122 is disposed in the rear of the cylinders 14, the invention is not limited this case. For example, the drive motor 122 may be disposed in the rear of the crank case 13. Although in the motorcycle 11 according to the embodiment the clutch 25 is disposed on the right side and the compressor unit 115 and the drive motor 122 are disposed on the left side, the invention is not limited this case; another arrangement is possible in which the clutch 25 is disposed on the left side and the compressor unit 115 etc. are disposed on the right side.

Although in the embodiment the radiator 33 is composed of the two radiators, that is, the top radiator 34 and the bottom radiator 35, the invention is not limited this case. For example, one of the top radiator 34 and the bottom radiator 35 may be replaced by an intercooler or an air-cooling oil cooler.

Although the embodiment is such that the invention is applied to the motorcycle 1, the invention is not limited to that case and may be applied to a saddle-ridden vehicle having a similar configuration (e.g., a three-wheel vehicle having two front wheels and one rear wheel).

The above-described embodiment is just one mode of the saddle-ridden vehicle according to the invention, and the technical scope of the invention is not limited to the embodiment. The elements of the embodiment can be replaced by or combined with existing elements etc. as appropriate. As such, the above-described embodiment should not be construed as restricting the invention as claimed.

What is claimed is:

1. A straddled saddle vehicle comprising:
an engine;
a clutch which enables or disables motive power transmission between a crank shaft provided in the engine and a transmission mechanism;
a turbocharger which compresses air for burning to be supplied to the engine; and
a throttle device which adjusts a rate of air supply to the engine by controlling an opening angle of a throttle valve using a drive motor, wherein:
the turbocharger comprises a turbine unit which is driven by exhaust gas of the engine and a compressor unit which receives a drive force of the turbine unit to compress air;
the clutch is disposed at one side, in a vehicle width direction, of the engine; and
the compressor unit and the drive motor are disposed at the other side of the engine in the vehicle width direction.

2. The straddled saddle vehicle according to claim 1, wherein: the turbocharger is disposed in front of the engine; and the drive motor is disposed in the rear of the engine.

3. The straddled saddle vehicle according to claim 2, wherein:
the engine comprises a cylinder which is erected from a top portion of a crank case which houses the crank shaft;
the turbocharger is disposed in front of the cylinder; and
the clutch and the drive motor are disposed in the rear of the cylinder.

4. The straddled saddle vehicle according to claim 3, wherein:
the straddled saddle vehicle further comprises an exhaust pipe which is connected to the turbine unit and discharges the exhaust gas of the engine to the outside;
the turbine unit is disposed adjacent to a central portion, in the vehicle width direction, of the engine;
the compressor unit is disposed at the other side of the turbine unit in the vehicle width direction; and
the exhaust pipe is disposed at one side of the turbine unit in the vehicle width direction.

5. The straddled saddle vehicle according to claim 2, wherein:
the straddled saddle vehicle further comprises an exhaust pipe which is connected to the turbine unit and discharges exhaust gas of the engine to the outside;
the turbine unit is disposed adjacent to a central portion, in the vehicle width direction, of the engine;
the compressor unit is disposed at the other side of the turbine unit in the vehicle width direction; and
the exhaust pipe is disposed at one side of the turbine unit in the vehicle width direction.

6. The straddled saddle vehicle according to claim 1, wherein:
the straddled saddle vehicle further comprises an exhaust pipe which is connected to the turbine unit and discharges the exhaust gas of the engine to the outside;
the turbine unit is disposed adjacent to a central portion, in the vehicle width direction, of the engine;
the compressor unit is disposed at the other side of the turbine unit in the vehicle width direction; and
the exhaust pipe is disposed at one side of the turbine unit in the vehicle width direction.

* * * * *